Figure 1:
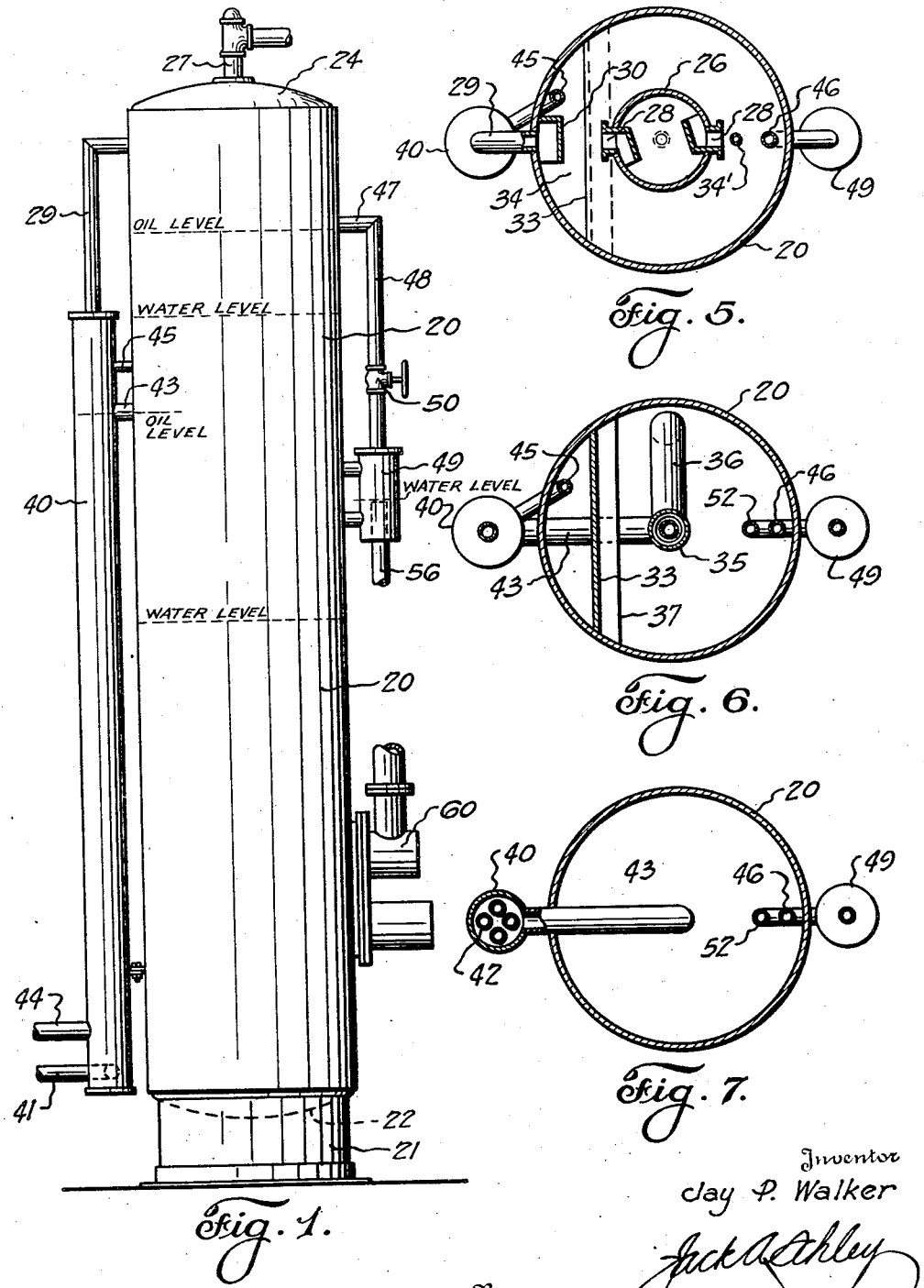

Inventor
Jay P. Walker
By Jack A. Ashley
Attorney

May 25, 1943.    J. P. WALKER    2,319,962
METHODS OF AND MEANS FOR TREATING AND/OR DEHYDRATING OIL,
GAS, AND WATER MIXTURES SUCH AS FLOW FROM AN OIL WELL
Filed June 24, 1940    4 Sheets-Sheet 3

Inventor
Jay P. Walker

By Jack A. Ashley
Attorney

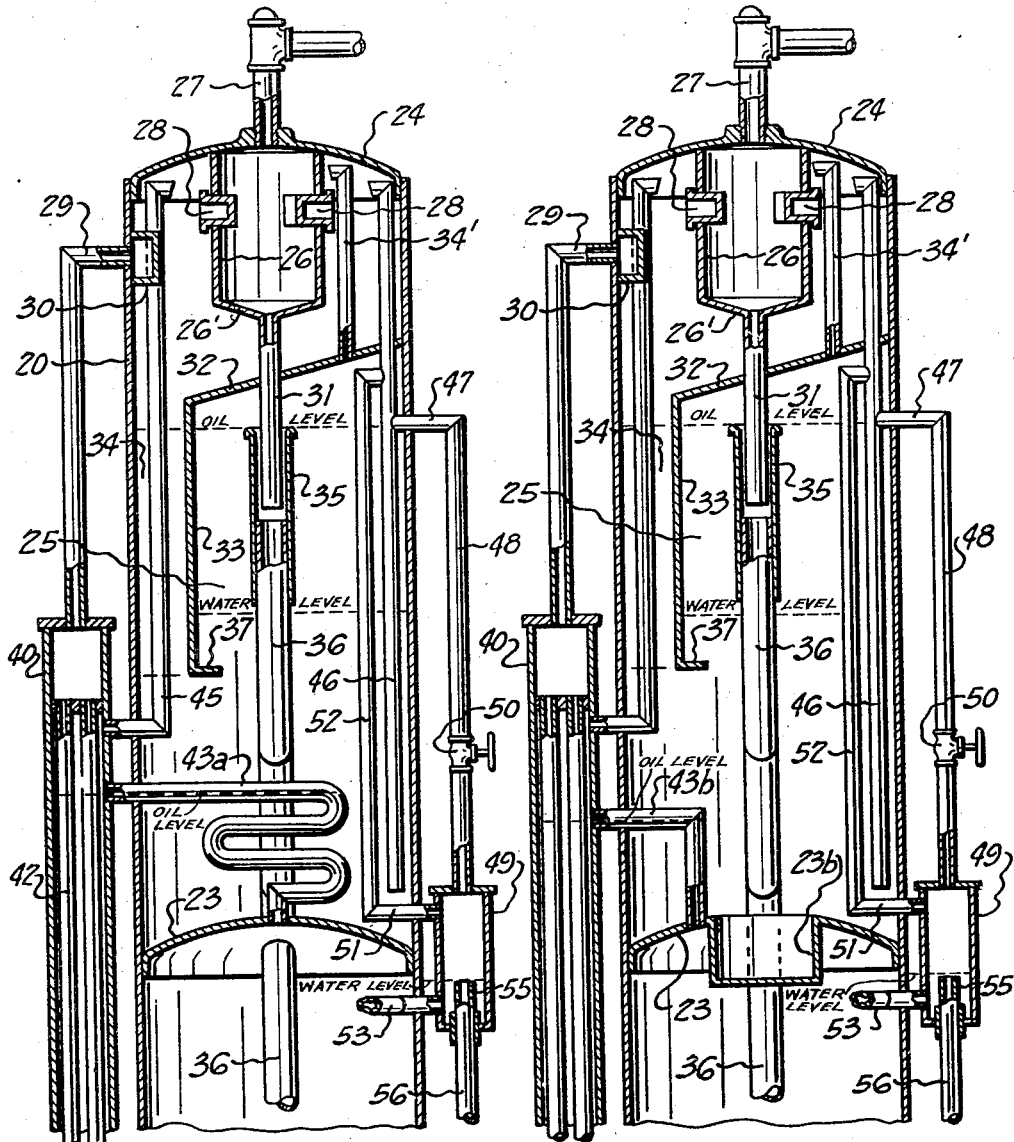

Patented May 25, 1943

2,319,962

UNITED STATES PATENT OFFICE 2,319,962

METHOD OF AND MEANS FOR TREATING AND/OR DEHYDRATING OIL, GAS, AND WATER MIXTURES, SUCH AS FLOW FROM OIL WELLS

Jay P. Walker, Tulsa, Okla., assignor of forty per cent to Guy O. Marchant and six per cent to C. G. Wells, both of Tulsa, Okla.

Application June 24, 1940, Serial No. 342,044

5 Claims. (Cl. 252—346)

This invention relates to new and useful improvements in methods of and means for treating and/or dehydrating oil, gas and water mixtures such as flow from an oil well.

The invention has particularly to do with certain improvements and amplifications of the method and apparatus set forth in my Letters Patent No. 2,181,685, issued November 28, 1939. In the method of the letters patent supra, a cooling zone is provided and a hot oil zone is maintained below the cooling zone, so that hot hydrocarbon vapors rising from the hot oil zone are passed in heat exchange relation with the cooling zone and condensed. These hydrocarbon condensates fall back into the oil and discharge with it, thus being restored to the oil in a more or less stabilized form and thereby aiding in maintaining the gravity of the oil being treated, as well as preventing the loss of valuable high volatile hydrocarbons.

In the method herein set forth, heat exchange is employed to condense the hot hydrocarbon vapors rising from the hot oil, but instead of providing a cooling zone spaced above the oil zone, the hot oil and vapors are conducted concurrently through a cooling zone and/or a segregated path, whereby the major portion of said vapors are condensed and caused to admix with or drop back into the oil to enrich the same and preserve its gravity; while any condensible vapors which may not be condensed during said concurrent flow are directed into a cooling area and condensed, so that the condensates are admixed with the hot treated oil.

One object of the invention is to bring the upper strata of the hot oil body into direct heat exchange with primarily separated, relatively cooler liquid, whereby vaporization of the hot oil is retarded and rich hydrocarbons are caused to remain with the oil.

Another object of the invention is to provide an inverted dished bottom or head for the primary separating chamber and a hot oil discharge conductor, admitting oil from below said bottom and extending outwardly above said bottom, so that the hot oil will maintain constant contact with said bottom, and be cooled to some extent by heat exchange with the relatively cooler separated liquid covering said bottom in the primary separating chamber.

A construction designed to carry out the invention will be hereinafter described, together with other features of the invention.

Figures 2, 3:
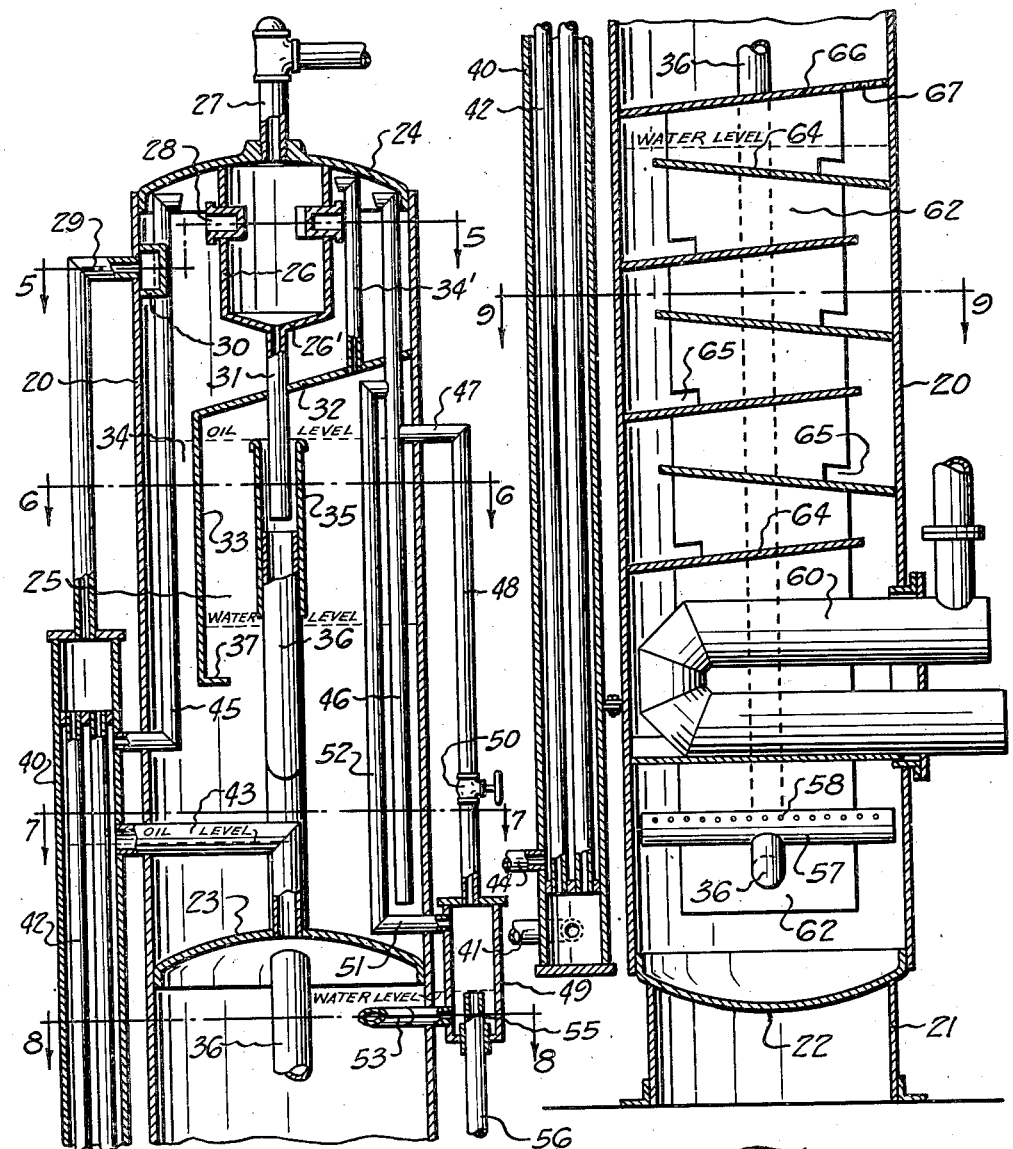
Figure 4:
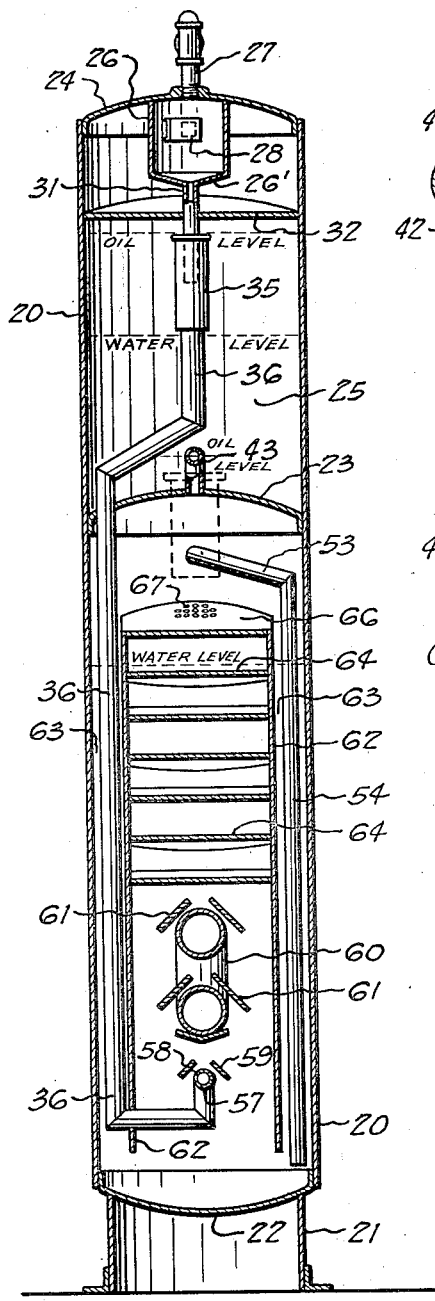
Figure 8:
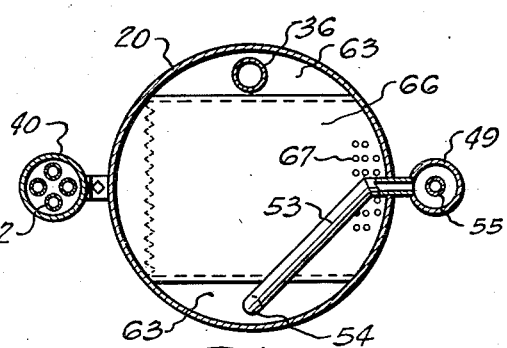
Figure 9:
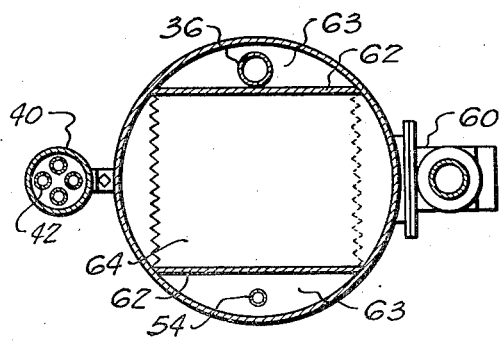

The invention will be more readily understood from a reading of the following specification and by reference to the accompanying drawings, in which an example of the invention is shown, and wherein:

Figure 1 is an elevation of a treater constructed in accordance with the invention, Figure 2 is an enlarged vertical, sectional view of the upper portion thereof, Figure 3 is a similar view of the lower portion of said treater, Figure 4 is a vertical, sectional view at right angles to Figure 1, Figures 5 to 9 are horizontal, cross-sectional views taken on respective lines of Figures 2 and 3, Figure 10 is a transverse, vertical, sectional view of the upper portion of a modified form of treater, and Figure 11 is a similar view of another modified form of treater.

In the drawings, the numeral 20 designates an upright cylindrical tank of the usual construction, such as is used in the building of separators. The tank is provided with a suitable base 21 and a false bottom 22. A crowned head or partition 23, having its upper side convex, is secured within the tank near the upper end thereof, while the extreme upper end of said tank is closed by a crowned top 24. The members 23 and 24 seal off the upper portion of the tank and form a preliminary or primary separating chamber 25. The chamber 25 could, if desired, be a separate container or tank.

A cylindrical scrubbing shell 26 is centrally suspended from the crowned top 24, to which it may be secured by welding or in any other suitable manner. This shell forms a gas chamber and the top 24 has an axial collar into which a gas discharge pipe 27 may be screwed. In order to whirl the gaseous fluids entering the shell 26, said shell is provided with louvers 28 having tangential outlets within the shell and flanged inlets on the outside of the shell, such louvers being well-known and illustrated at 18 in my re-issue Letters Patent No. 17,983 and also in my Letters Patent No. 1,755,527.

An influent inlet pipe 29 extends through the wall of the tank 20 opposite the shell 26 and discharges into a diverter box 30, whereby the well stream or influent is caused to take a circumferential or helical course around the inner wall of the tank. The influent is scrubbed on the wall of the tank, whereby the liquids flow downwardly into the chamber 25, while the gaseous fluids, which are separated by the scrubbing action, rise in the tank so as to enter the louvers 28 of the shell 26. The gaseous fluids or vapors are caused to whirl within the shell 26, whereby the gas is liberated and the liquids are dropped out. From the shell 26, the gas is carried off through the outlet pipe 27, which may have a control valve (not shown) connected therein. A liquid drain pipe 31 depends from the bottom of the shell 26 so that the separated liquids are discharged from said shell through the pipe.

A shield or deflector 32, having an inclined top, is mounted within the tank 20 just below the hopper bottom 26' of the shell 26 and, as is clearly shown in Figure 2, the drain pipe 31 which extends from the bottom of the shell passes through the inclined top of this shield or deflector. The shield 32 is provided with a depending skirt or apron 33 directed downwardly from the edge of its inclined top and spaced from the wall of the tank to form a passage or channel 34. The shield has a two-fold purpose in that the influent liquids are caught on its inclined top and scrubbed during their downward flow to release gas, and stratified liquids below the shield are protected against undue agitation.

A gas equalizing pipe 34' extends from the top of the shield to the upper end of the tank, said pipe terminating adjacent the exterior of the shell 26 (Figure 2). The drain pipe 31 which depends from the lower end of the shell 26 passes through the top of the shield and telescopes the upper end of an overflow sleeve 35 of somewhat larger diameter. The sleeve is mounted for vertical adjustment on the upper end of a conductor or downpipe 36, which extends downwardly through the chamber 25. The conductor 36 is deflected or offset so as to pass downwardly through the crowned head 23 off-center of said head, as is clearly shown in Figure 4.

As the influent enters the chamber from the inlet pipe 29, the gas separates from said influent while the liquid flows downwardly in the chamber 25. The gaseous fluids flowing upwardly enter the shell or gas chamber 26 through the louvers 28, wherein they are given an additional scrubbing to release entrained gas. The gas escapes by way of the pipe 27, while the liquids drain downwardly through the pipe 31. The influent, after whirling around the tank, brings its liquid to the inclined top of the shield 32. The liquids flow down the shield through the passage 34 and pass beneath an inwardly directed flange 37 which is formed on the lower end of the apron 33 of said shield. When the influent liquids reach this point, much of the gas has been scrubbed out and the water and oil are ready for stratification.

The water and oil levels in the chamber 25 will define water, oil and gas spaces or zones therein. The gases rise upwardly within the tank and further gas is separated from the influent within the shell 26. The remaining liquids, with some gas in solution, flow downwardly within the separating chamber 25, where a major portion of the water is separated. The oil will tend to float and rise within the chamber while the water will settle or precipitate, whereby an oil and water zone is created. However, all of the water does not settle out in the chamber 25 and, thus, the liquids entering or overflowing into the pipe or conductor 36 comprise oil with, perhaps, some gas in solution, and some water admixed therewith, which is an emulsion mixture requiring further treatment.

The influent may be preheated, if desired, and any suitable device may be used for the purpose. A preheater 40, similar to that shown and described in my Letters Patent No. 2,181,685, may be employed. In this device, the oil, gas and water mixture enters through an inlet pipe 41 at the bottom and flows upwardly through a plurality of tubes 42 to the top of the preheater. The inlet pipe 29 which discharges into the upper end of the tank 20 has its lower end connected to the top of the preheater, whereby the influent is conducted through the preheater and then into the tank. A hot oil discharge or outlet pipe 43 extends axially from the crowned heat 23 and, as will be explained, conducts the hot oil into the preheater 40. The hot oil flows downwardly through the preheater around the tubes 42 and escapes from the lower end thereof through a discharge pipe or outlet 44. The counter-flowing influent and oil undergo a heat exchange, whereby the influent is preheated and the oil is cooled. A gas escape pipe 45 connects the oil space of the preheater 40 with the upper portion of the tank 20.

As explained, the influent liquids flow downwardly along the inclined top of the shield 32 and then downwardly through the passage 34 and beneath the inwardly directed flange 37 at the lower end of the apron of said shield. The oil stratifies above the water, as has been described, and the oil level under the shield may be regulated by vertically adjusting the sleeve 35.

For discharging the water from the primary or first stage separation, an upright overflow pipe 46 is mounted at one side of the chamber 25. The lower end of the pipe terminates adjacent the crowned head 23, while the upper portion extends through the top of the shield 32 and terminates near the top 24 of the tank. This pipe is divided into a water leg and a gas leg, a lateral 47 leading from the intersection of the two legs through the side of the tank. A downpipe 48 leads from the lateral to a water syphon box 49 and includes a regulating valve 50.

A gas vent pipe 51 extends from the upper end of the box 49 through the wall of the tank and connects with a gas riser 52 within the chamber 25. The riser connects at its upper end with the gas leg of the pipe 46. A pipe 53 extends laterally from the lower end of the syphon box 49 and through the tank wall below the crowned head 23. The inner end of the pipe 53 is connected to a downwardly extending pipe 54, which extends to the lower end of the tank, as will be hereinafter explained. The water syphon box 49 is located relatively opposite the head 23, outside of the tank and said box is provided with an upright overflow nipple 55, which nipple is connected to a water discharge pipe 56.

The upright conductor or pipe 36 which extends from the chamber 25, through the crowned head 23 and downwardly into the lower chamber of the tank, extends downwardly in close proximity to the outer surface of the tank, as is clearly shown in Figure 4. At its lower end, the pipe 36 is connected to the central portion of a horizontal nozzle 57 which extends diametrically across the tank, as is best shown in Figure 3. The nozzle 57 is usually placed a suitable distance above the bottom 22 to provide a water settling and collecting space therebelow, in which extraneous matter may also deposit. This nozzle possibly has longitudinal rows of perforations 58 on its upper side so as to discharge the liquid mixture upwardly in numerous small streams. The tank contains a body of water, usually salt water, up to a certain level which is maintained by the syphon pipe 54, which has its upper end connected through the pipe 53 with the water syphon box 49. The pipe 54 conducts water from the bottom of the tank and into the syphon box, from where it overflows into the nipple 55 and then outwardly through the discharge pipe 56.

Any suitable washing or dehydrating means may be used in the tank and may be either wholly or partially immersed in the body of salt water for separating the water from the oil. I have illustrated a unit or separator similar to that shown in my Letters Patent No. 2,181,688, wherein the body of salt water is heated and the mixture discharged from the nozzle 57 is baffled upwardly therethrough to extract and precipitate the water from the mixture.

In the drawings, inclined baffles 59 are shown above the nozzle 57 and a return-bend firebox 60 is mounted across the tank just above said baffles in alinement with the nozzle. The small upwardly flowing streams are directed by the baffles against the bottom of the lower leg of the firebox and flow upwardly on each side thereof, whereby they are heated. Similar inclined baffles 61 overhang the firebox and keep the upwardly flowing streams in heating contact therewith. It is within the scope of this invention to heat the body of salt water by any suitable means or to supply heated salt water to the tank. Any suitable heating element may be introduced into the lower leg of the firebox.

The skirts of a vertical housing 62 extend on each side of the firebox and nozzle, whereby vertical passages or ducts 63, open at their upper and lower ends, are formed with the wall of the tank. Above the firebox, staggered upwardly inclined cross baffles 64 are mounted in the housing 62 and may have their free ends serrated to divide upwardly flowing liquids into numerous small streams. Water draining openings 65 are provided in each side wall of the housing near the lower ends of the baffles 64. As the heated mixture flows upwardly, the baffles will wash out the entrained water which is admixed with the oil and discharged from the nozzle 57. The water which is washed out will tend to run down the upper sides of the baffles and drain through the openings 65 into the passages 63.

By the time the mixture reaches the top 66 of the housing, the entrained water will be substantially washed out of the oil and water mixture and the clean oil will rise and float upon the body of water. The water which drains into the passages 63 flows downwardly and cools, finally admixing with the water in the bottom of the tank, whereby the water is recirculated as described in the aforesaid Letters Patent. The top of the housing is provided with perforations 67, whereby the oil may pass upwardly into the upper portion of the lower chamber of the tank and into contact with the crowned head 23. As explained, a discharge pipe 43 leads from the center of the crowned head 23 out through the wall of the tank to the preheater 40. The upper stratum of oil within the lower chamber of the tank contacts the relatively cool surface of the head 23 and this creates a cooling zone. The cooling zone will cause the hot oil to be cooled, which will, with any free gas, flow outwardly with the oil through the pipe 43. There may be some condensing of gaseous products in the pipe 43 and, by increasing its diameter, considerable condensation might be obtained. The hot oil and gas discharge into the preheater and the gas escapes through the pipe 45 to the upper end of the chamber 25. It is pointed out that the provision of the crowned head 23 is an important feature of the invention since it provides the cooling surface which may be contacted by the oil to release some of the gas in solution and also to condense gas which might contact said surface.

Briefly, in operation, the influent is brought through the inlet pipe 29, either direct from the well or other source, or from the preheater 40. The influent is discharged into the diverter box 30 in the tank 20, whereby it is whirled around the tank on the inner surface thereof. This circumferential action scrubs out a considerable amount, possibly the major portion, of the gas; some gas, however, will remain in solution. The liberated gas and gaseous fluids rise and enter the shell 26 through the inlets 28, wherein they are whirled and the liquids scrubbed out. These liquids drain downwardly through the pipe 31 and then into the conductor or downpipe 36.

The liquids which have been separated from the gas within the chamber 25 flow downwardly along the inclined top 32 of the shield and additional gas is liberated by a further scrubbing action. The liquids then pass downwardly beneath the skirts of the shield and, manifestly, said shield protects these liquids against undue agitation by the incoming influent. As before described, the water, oil and gas stratify in the chamber 25 whereby a primary or preliminary separation of water is obtained. Preheating may be very helpful in some instances. The invention is not dependent upon the separation of gas in either the chamber 25 or the shell 26, because the gas may be previously separated.

The gas which may be separated beneath the shield 32 may flow upwardly through the pipe 34' to the upper end of the tank. The water which is extracted in the chamber 25 flows upwardly through the water leg of the upright overflow pipe 46, then through the lateral 47 and downwardly through the pipe 48 and into the water syphon box 49. From the box, the water overflows into the discharge pipe 56. Any gas which may be liberated within the syphon box may pass upwardly through the gas leg 52 and then escape upwardly into the upper end of the tank. The oil which is separated within the chamber 25, which may be an oil and water mixture, flows out through the pipe 36 and is conducted downwardly by said pipe to the nozzle 57.

At the nozzle, the oil and water mixture is discharged from the perforations 58 and is baffled upwardly through the body of heated salt water to extract water from the influent. The upwardly flowing mixture is heated by contacting the lower leg of the firebox 60 and will then pass upwardly through and around the baffles 64, whereby substantially all of the remaining entrained water will be washed out. The hot oil will rise upwardly through the perforations 67 in the top 66 of the housing 62 and also, the gas will pass upwardly through these perforations with the hot oil.

The upper stratum of oil contacts the relatively cool surface of the crowned head 23, which tends to cool the oil. The oil and any free gas flow outwardly through the discharge pipe 43 which leads to the preheater 40. As is pointed out, there might be some condensation of gaseous products in the pipe 43 and, by increasing its diameter, considerable condensation can be obtained. The oil discharged into the preheater will, of course, flow downwardly therethrough and escape through the pipe 44, while the gas rises upwardly in the preheater and is conducted therefrom through the gas release pipe 45. The water which is separated in the lower chamber of the tank 20 is discharged therefrom through the pipe 54, lateral 53 and syphon box 49. It will be evident that, by the syphonic hook-up, water is discharged from the upper and lower chambers of the tank by way of the single discharge pipe 46. Since the nipple 55 is adjustable, predetermined liquid levels in the lower chamber of the tank may be maintained.

In Figure 10, a slightly modified form of the invention is shown. This form is identical in construction with the form shown in Figures 1 to 9, with the exception of the hot oil and gas discharge pipe. In place of the pipe 43, a discharge pipe 43a is provided and, as is clearly shown in Figure 10, this pipe is elongated by providing a number of bends or curves therein. In this form, the crowned head 23 provides a cooling surface and, in addition, the pipe 43a provides additional cooling surface. In other words, the hot oil and gas are caused to take a circuitous or elongated path through the pipe 43a, whereby condensation of the gaseous fluid during its passage through the pipe is increased.

Still another form of the invention is shown in Figure 11. In this form, the head 23 is formed with a sump 23b which is preferably formed integral with its central portion. It will be manifest that the provision of this sump increases the exposed surface of the head 23, whereby an increased cooling of the oil contacting this surface is obtained. In this instance, the hot oil and gas discharge pipe 43b leads from the preheater to the head 23, being connected to said head off center thereof. In all the forms of the invention, a cooling zone is created at the upper end of the lower chamber of the tank and this cooling zone facilitates condensation of the gaseous fluids contacting the same and also acts to cool the hot oil.

What I claim and desire to secure by Letters Patent is:

1. In a well stream dehydrating apparatus, the combination of a tank, a separating chamber at the upper end of the tank having a bottom extending across the tank, means for admitting a well stream to the separating chamber a substantial distance above the bottom thereof, means for accumulating in said chamber and on said bottom a stratum of free water separated from the well stream, means for conducting oil from said chamber to the lower portion of said tank, means in the tank for heating and washing the conducted oil, a conductor for conveying the heated oil through the water stratum above the bottom of the separating chamber, whereby the heated oil is constantly maintained in intimate contact with the underside of the bottom of said chamber to cool said oil and condense gaseous components therein, and means for carrying off said dehydrated and cooled oil.

2. In a well stream dehydrating apparatus, the combination of a tank, a separating chamber at the upper end of the tank having a bottom extending across the tank, means for admitting a well stream to the separating chamber a substantial distance above the bottom thereof, means for accumulating in said chamber and on said bottom a stratum of free water separated from the well stream, means for conducting oil from said chamber to the lower portion of said tank, means in the tank for heating and washing the conducted oil, a conductor for conveying the heated oil through the water stratum above the bottom of the separating chamber, whereby the heated oil is constantly maintained in intimate contact with the underside of the bottom of said chamber to cool said oil and condense gaseous components therein, and means for carrying off the dehydrated oil through said stratum of initially separated free water to cool said oil and condense hydrocarbon components therein.

3. In a well stream dehydrating apparatus, the combination of a tank, a separating chamber at the upper end of the tank having a bottom extending across the tank, means for admitting a well stream to the separating chamber a substantial distance above the bottom thereof, means for accumulating in said chamber and on said bottom a stratum of liquid separated from the well stream, means for conducting oil from said chamber to the lower portion of said tank, means in the tank for heating and washing the conducted oil, means for maintaining the heated oil in intimate contact with the underside of the bottom of said chamber to cool said oil and condense gaseous components therein, and a coiled conductor extending from said bottom through the liquid stratum and out of the tank for conducting the oil in a segregated path through said stratum of liquid, whereby said oil is additionally cooled.

4. In a well stream dehydrating apparatus, the combination of a tank, a separating chamber at the upper end of the tank having a bottom extending across the tank, means for admitting a well stream to the separating chamber a substantial distance above the bottom thereof, means for accumulating in said chamber and on said bottom a stratum of liquid separated from the well stream, means for conducting oil from said chamber to the lower portion of said tank, means in the tank for heating and washing the conducted oil, the bottom of the separating chamber having a well depending therefrom, and means connected with said bottom and extending thereabove for conducting the dehydrated oil out of the tank, whereby the hot oil is brought into heat exchange contact with the underside of said bottom and the well for cooling said oil and condensing gaseous fluids flowing therewith.

5. The step in the method of treating oil emulsion fluids wherein water and emulsified oil are primarily separated and a stratum of water is provided above a heated body of washing water on which a body of hot oil is collected in heat exchange relation with the stratum of water, which includes flowing the hot oil in a segregated path through the water stratum to cool said oil and condense liquefiable fractions therein.

JAY P. WALKER.